United States Patent [19]
Gillemot et al.

[11] 3,920,886
[45] Nov. 18, 1975

[54] KIT OF SPLICE COMPONENTS FOR ENCAPSULATING A CABLE SPLICE AND METHOD OF INSTALLING SAME

[76] Inventors: George W. Gillemot, 2331 20th St., Santa Monica, Calif. 90405; John T. Thompson, 244 Loring St., Los Angeles, Calif. 90024

[22] Filed: June 16, 1972

[21] Appl. No.: 263,551

[52] U.S. Cl. ............... 174/93; 174/76; 174/138 F; 206/223
[51] Int. Cl.² ........................................ H02G 15/08
[58] Field of Search .................... 174/91–93, 174/76, 77 R, 138 F; 264/272; 29/624, 628; 206/223

[56] References Cited
UNITED STATES PATENTS
| | | | |
|---|---|---|---|
| 3,233,035 | 2/1966 | Black | 174/93 |
| 3,449,507 | 6/1969 | Channell | 174/93 |
| 3,458,649 | 7/1969 | Channell | 174/93 |

FOREIGN PATENTS OR APPLICATIONS
| | | | |
|---|---|---|---|
| 177,138 | 11/1961 | Sweden | 174/93 |
| 1,159,536 | 12/1963 | Germany | 174/93 |
| 1,187,920 | 4/1970 | United Kingdom | 174/93 |

Primary Examiner—Darrell L. Clay
Attorney, Agent, or Firm—Harris, Kern, Wallen & Tinsley

[57] ABSTRACT

A kit of components for encapsulating a branchout splice to an installed power distribution cable and the like and a method of installing the components all of which include a longitudinally slit sidewall. The kit includes a resilient tubular splice housing having an interlocking portion and slit elastomeric grommets sealing the cabling to the housing ends. A sleeve valve encircles the housing and closes a potting compound charging port. The kit includes a ductile splice connector having slit tubular passages clenchable about exposed surfaces of cabling conductors to hold them spliced together. Additional slit sleeves serve as adapter grommets for accommodating smaller cable sizes.

13 Claims, 8 Drawing Figures

KIT OF SPLICE COMPONENTS FOR ENCAPSULATING A CABLE SPLICE AND METHOD OF INSTALLING SAME

This invention relates to splice assemblies, and more particularly to a kit of components for encapsulating a branchout splice from a main cable such as a power distribution cable and to a method of completing such an encapsulated splice assembly.

There are now available techniques for providing a high-capacity high-strength electrical splice between a continuous main power distribution cable and a branch-out cable utilizing a deformable clamping member clenchably interconnecting the two cables without need for doing more than removing a length of insulation from each. Not infrequently such branchouts are made in multiple. This practice presents problems as respects the enclosure of the splice connection and the adjacent portions of the cable sheath with a suitable reliable weather-tight protective housing. Desirably the enclosure should be readily assembled about the cabling using a minimum number of parts.

These needs are satisfied by the present invention in a highly satisfactory manner using a minimum number of tubular elastomeric components each split longitudinally of one side to permit the tubular members to be expanded sufficiently for assembly to the cabling from one side thereof after completion of the splice connection. These components include a resilient relatively stiff main body, a sleeve valve of the same material snugly embracing the mid portion of the main body, and several grommets of soft flexible elastomeric material embracing the cabling to either side of the splice connection and cooperating to close the opposite ends of the main body. Some of these grommets include adapter sleeves seated in passages of the main grommet and serving to provide a snug seal between this passage and smaller size branchout cables. The rotary valve overlies a charging opening for potting compound filling the interior of the assembled splice housing. After the housing has been charged, the valve is rotated to seal the charging opening. The main housing includes portions along its slit edges designed to interlock with one another to hold the slit edges closed and snugly embracing the closure grommets at its opposite ends until the potting compound takes a set. Thereafter, the potting compound forms a strong bond with surfaces in contact therewith and supplements the locking tangs in holding the main body assembled. Desirably, the grommets include flexible annular ribs assuring sealing contact with juxtaposed surfaces of the cabling and of the housing parts. If one of the cable outlets is not required to seat a cable, a closure plug is inserted and sealed in place by contact with the potting compound. All components required to complete a splice housing assembly, including a settable potting compound, are preferably packaged for shipment and protection against loss of components until ready for use in the field.

Accordingly, it is a primary object of this invention to provide a kit of cable splice components for encapsulating a branchout splice from a main cable and to an improved method of utilizing the same to encapsulate a splice connection.

Another object of the invention is the provision of a cable splice enclosing assembly including a plurality of cooperating split tubular members having sufficient flexibility for assembly about a cable splice from the side of the cable and including a slit outer housing with integral interlocked means along its slit edges.

Another object of the invention is the provision of a cable splice housing comprising an open end tube slit lengthwise of one side and equipped with interlocking means for holding its slit edges closed together.

Another object of the invention is the provision of a cable splice housing including an open end tube slit lengthwise of one side and sufficiently resilient to permit of its assembly about cabling from one side of the cable and including a cooperating slit tubular valve closely embracing the first mentioned tube and rotatable between a position for charging the housing with potting compound and a second position closing the charging opening.

Another object of the invention is the provision of soft resilient tubular grommets slit along one side of tubular cable seating passages formed therein and including annular ribs projecting from the walls of said passages and from the exterior of the grommet periphery for sealing engagement with cabling and with the splice housing.

These and other more specific objects will appear upon reading the following specification and claims and upon considering in connnection therewith the attached drawing to which they relate.

Referring now to the drawing in which a preferred embodiment of the invention is illustrated:

Figure 1:
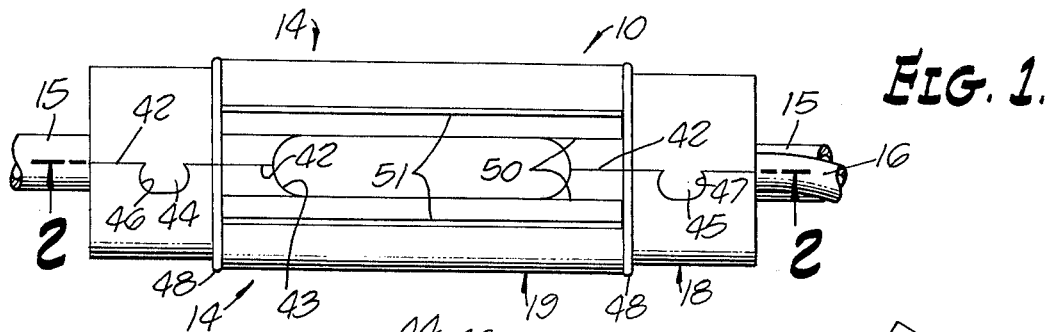
FIG. 1 is a longitudinal view of a preferred embodiment of the invention assembled to cabling and showing the charging valve in open position.

Referring initially more particularly to FIGS. 1–6 there is shown an illustrative embodiment of the invention cable splice housing, designated generally 10, the components of which are shown packaged as a kit in a plastic envelope 11. The kit components include a sealed package 12 enclosing a package of polymerizable potting compound, a ductile metal splice connector 13, and all components of the splice housing assembly per se 14. These various components are sealed within the plastic package 11 for protection against loss or exposure to the elements or contaminants prior to use.

It will be understood that the sealed envelope 12 preferably contains the two principal ingredients of the potting compound in liquid form sealed in an envelope and held separated from one another therein in any well known manner, as by a removable spring clip in accordance with a technique well known in this art and shown in greater detail in our U.S. Pat. No. 3,523,607, granted Aug. 11, 1970. In accordance with customary practice, the spring clip is removed immediately prior to use of the compounds, thereby permitting the ingredients to be thoroughly intermixed before being charged into the splice housing where the compound polymerizes into a solid mass adhering strongly to surfaces in contact therewith.

All components of the splice housing 14 are generally tubular and each includes at least one longitudinal slit through the wall thereof thereby permitting the edges of the slit to be spread apart sufficiently for lateral assembly over cabling.

As here shown by way of example, the cabling comprises a continuous power distribution cable 15 and a branchout power cable 16 rigidly and inseparably spliced together between the exposed conductors of each by the ductile metal connector 13. This connector has laterally opening channels along either lateral edge for receiving bared cable conductors following which the connector is placed between the jaws of a heavy duty clenching device operating to compress the connector into high pressure conforming contact with the conductors. In so doing, substantial areas of the connector are upset and deformed as the lateral edges are pressed against one another to completely encircle the conductors of each cable.

Housing assembly 14 includes a tubular main body shell 18, a valve sleeve 19, a pair of tubular grommets 20, 20, a plurality of adapter grommets 22, and a plurality of plugs 23 sized to have a snug frictional fit within the interior of the adapter grommets 22. The latter fit frictionally within either of the two cylindrical passages 24, 25 (FIG. 3) of grommets 20.

The main grommets 20 have a thick walled tubular body 26 integral with a pair of similar thick tubular walls 28, 29 forming the walls of the cylindrical passages 24, 25. Each of the passages 24, 25 is adapted to seat a cable or, alternatively, one of the adapter grommets 22 when it is desired to accommodate a smaller diameter branchout cable, such as cable 16.

The sidewalls of main grommets 20 and of adapter grommets 22 are slit lengthwise of one side thereof permitting the edges of the slit to be expanded and opened away from one another sufficiently to permit insertion of the cable laterally into the interior of the cable seating passage. Thus, grommet 20 is slit along the diametrically opposed sides thereof as indicated at 30, 30 to provide access into the cable seating passages 24, 25. Likewise, adapter grommets 22 (FIGS. 2 and 3) are provided with a similar slit 32 permitting the adapters to be spread and assembled about a smaller diameter cable 16.

Another feature of the main grommets 20 is the provision of at least one and preferably a plurality of annular flexible ribs 34 encircling the exterior of the grommets as well as similar flexible ribs 35 projecting inwardly from the sidewalls of the cable seating passages 24, 25. These flexible resilient ribs accommodate tolerance variations in the dimensions of the parts and assure a fluid tight seal between the grommet, the interior sidewalls of tubular shell 18 and the exterior of cabling 15, or the exterior of adapter grommets 22.

Figure 3:
FIG. 3 is a cross sectional view on line 3—3 of FIG. 2 but showing the charging valve rotated to closed position.
Figure 6:
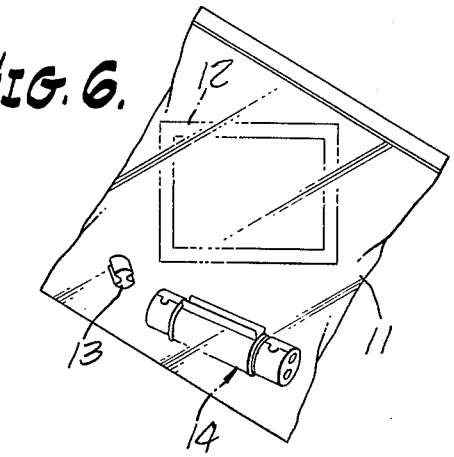
FIG. 6 is a perspective view of the kit of splice housing components typically employed to complete a splice between a main cable and a branchout cable.
Figure 2:
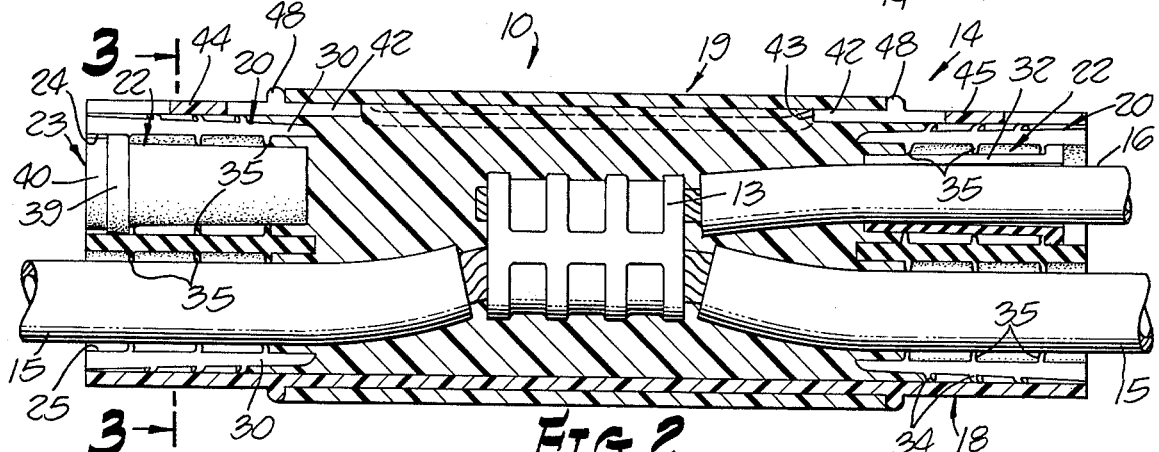
FIG. 2 is a longitudinal sectional view on an enlarged scale taken along line 2—2 on FIG. 1.
Figure 4:
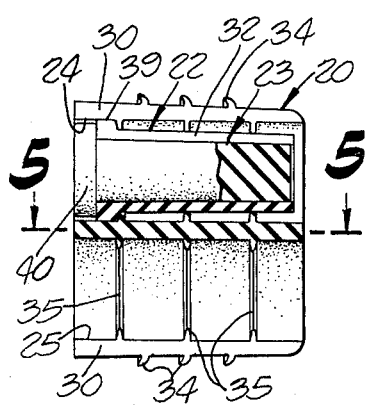
FIG. 4 is a cross sectional view of one of the grommet units showing one passage closed by an adapter grommet and a cooperating plug and the other cable passage empty.
Figure 5:
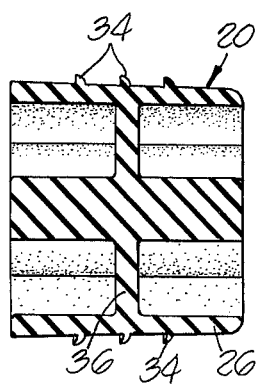
FIG. 5 is a cross sectional view taken along line 5—5 on FIG. 4.

It is also pointed out by reference to FIGS. 3, 4 and 5 that the walls of main grommet 20 are of similar thickness throughout and that the tubular walls of the main body as well as that forming passages 24, 25 are preferably interconnected interiorly of the grommet by a transverse partition 36. Actually, this partition comprises a pair of similar sector-shaped walls having the configuration best shown in FIG. 3 and there shown as positioned midway between the opposite ends of the grommet. These partitions seal off the interior of the splice housing from the atmosphere and reinforce and support the tubular walls 28, 29 encircling the spliced cables.

The outer ends of adapter grommets 22 have a flanged end 39 and likewise plug 23 has a flanged end 40 (FIG. 4) designed to abut flange 39 when assembled as shown in FIG. 4. If the passageway is occupied by a cable, plug 23 as well as the adapter grommet 22 may be discarded if not needed.

The main body shell 18 may be molded from any suitable rigid resilient elastomeric material, such as a high durometer plastic and one sidewall is slit from end to end as indicated at 42 in FIG. 1. A potting compound charging opening 43 is formed through the sidewall and conveniently intermediate the opposite ends of slit 42. This slit permits the housing shell to be expanded sufficiently to receive the main cable and branch cable. Upon releasing this spreading pressure, the housing quickly closes and is locked closed by the locking tangs, such as the tangs 44, 45 shown in FIG. 1. That is, which mate with complementally shaped cutouts 46, 47 in the other edge of the slit. The interlocking engagement or disengagement is accomplished simply by depressing one side of the shell more than the other until the tangs 44, 45 are in registry with the cutouts 46, 47. The presence of the grommet assemblies interiorly of the opposite ends of shell 18 do not interfere with the locking or unlocking of shell 18 owing to the resilience of the grommets and their compressibility.

Surrounding the central portion of the main body shell 18 and held captive between the annular keeper flanges 48, 48 is a tubular sleeve valve 19 formed of the same material as the main body shell. The valve is slit to provide a wide opening 50 throughout its length and out-turned opposite edges 51, 51 (FIG. 3) cooperate to provide a funnel or hopper facilitating charging the interior of the splice casing with potting compound when the valve opening is aligned with charging opening 43. Thereafter the valve is readily rotatable so that its opening 50 is misaligned with charging opening 43.

Figure 7:
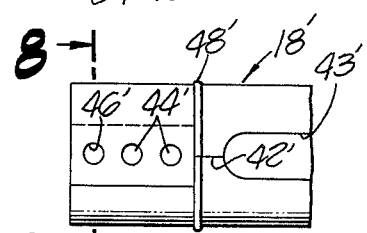
FIG. 7 is a fragmentary view of one end of an alternate splice housing construction.
Figure 8:
FIG. 8 is a cross sectional view on an enlarged scale taken along line 8-8 on FIG. 7.

Referring to FIGS. 7 and 8, a modified splice housing or shell 18' is shown which differs from that shown in FIGS. 1–6 only as respects the means for holding the shell slit locked closed, the same or similar parts described above being designated by the same reference characters but distinguished by the addition of a prime.

The end portions of shell 18' outwardly of the valve assembly flange 48' are tapered, as is best shown in FIG. 8, and overlap one another in areas at the opposite ends of slit 42'. One of the tapered edges is provided with several locking bosses or tangs 44' seating in cutouts 46' formed through the other tapered edge of the slit. The overlapped edges are unlocked by depressing one edge relative to the other until the tangs are released from cutouts 46' whereupon the shell can be expanded or spread sufficiently to receive the spliced cabling.

In use, a section of the main distribution cable 15 has its sheath removed to expose the conductors and the same is true of one end of the branchout cable 16. Thereupon the ductile connector 13 is assembled over the exposed conductors of the cables, as described above, and clenched into its assembled position. The main grommets 20, 20 are then assembled over cables 15, 16 to either side of connector 13 by spreading the edges of the slits 30 for one of the passages 25 of each grommet. One of the adapter grommet sleeves 32 is then assembled over cable 16 at a point to the right of the splice housing, as viewed in FIG. 2, and cable 16 assembled into passage 24 of grommet 20. Thereafter, grommet 22 is slid axially along cable 16 until it is properly seated within passage 24. The interior of grommet 22 has a snug fit with the cable and its exterior is in wiping contact with the sealing ribs 35.

Grommets 20, 22 having been assembled, they are shifted as necessary along the cabling so that their remote ends are spaced apart by the length of the tubular shell 18 of the splice housing.

The next operation is to spread the opposite edge portions of slit 42 in shell 18 apart by inserting the fingers against the opposite longitudinal edges of the charging opening 43 for potting compound. While so spread the shell is inserted laterally over the cable splice and over both of grommets 20, 20 and its opposite ends are manipulated to interlock locking tangs 44 with cutouts 46. Valve sleeve 19 is then assembled laterally over the cabling to one end of the splice assembly and held expanded sufficiently for endwise telescopic assembly over the retainer flanges 48 for the valve sleeve. As soon as the valve is centralized between flanges 48, it is released and snugly grips the underlying portion of shell 18.

The splice assembly is now in readiness to be charged with potting compound. Package 12 is opened, the spring clip or other means on the potting compound package therewithin is removed so that the two principal ingredients can be intermixed. Valve 19 is rotated until the flanges 51, 51 are registered with the opposite edges of the charging opening 43. The compound is then poured into the opening as air within the splice housing escapes. As soon as the operator is certain that all portions of the interior are properly charged to a level flush with the charging opening, he rotates the valve to close opening 43 and allows the compound to take a firm set. Owing to the strong adhesive characteristics of the compound he bonds all parts together into an interior assembly and hermetically seals the splice against the entry of moisture.

While the particular kit of splice components for encapsulating a cable splice and method of installing same herein shown and disclosed in detail is fully capable of attaining the objects and providing the advantages hereinbefore stated, it is to be understood that is is merely illustrative of the presently preferred embodiments of the invention and that no limitations are intended to the detail of construction or design herein shown other than as defined in the appended claims.

We claim:

1. A housing assembly for use in encapsulating a cable splice and adapted to be assembled about a midlength portion of a continuous cable, said housing assembly comprising: an open-ended tubular shell of resilient non-conductive material slit lengthwise thereof, a potting compound charging opening through the wall of said shell, means integral with the portions of said shell adjacent either edge of the slit therealong separably interlocked with one another to hold said resilient shell against expansion, a main grommet of soft elastomeric material at each end of said shell having annular radial sealing rib means projecting therefrom and having a snug sealing fit with the interior surface of said shell, said main grommets each having a passage therethrough sized to have sealing engagement with the exterior of a cable, said main grommet having a slit opening generally radially from the interior of said passage through the outer peripheral surface of said main grommet permitting a cable to be inserted into said passage by bodily lateral movement of the cable past said slit while the edges thereof are held expanded away from one another, slit tubular valve means snugly embracing the exterior of said main shell and rotatable between a position exposing said charging opening and a second position closing the same, and means for holding said valve means captively assembled to said main shell but free for rotation about their common longitudinal axes.

2. A housing assembly as defined in claim 1 characterized in that said passage through said grommets includes flexible annular rib means projecting inwardly and adapted to have an interference fit with a cable seated in said passage.

3. A housing assembly as defined in claim 1 characterized in that at least one of said main grommets includes a plurality of said cable seating passages each adapted to accommodate a separate cable, and readily removable closure means adapted to close at least one of said cable seating passages when not needed to accommodate a conductor.

4. A housing assembly as defined in claim 3 characterized in that said closure means includes a tubular grommet of pliant resilient elastomeric material having a longitudinal slit from end to end thereof.

5. A housing assembly as defined in claim 1 characterized in that said valve means includes out-turned flanges along the edges of the slit therein and cooperating to form a flow guide for potting compound while being charged through said compound charging opening.

6. A housing assembly as defined in claim 1 characterized in that the portions of said main shell adjacent the opposite ends of said slit overlap one another and include means on said overlaps engageable with one another to lock said main shell against circumferential expansion.

7. A housing assembly as defined in claim 6 characterized in that the overlapping opposite end portions of said main shell taper complementally to one another circumferentially of said main shell.

8. A kit of splice components for use in enclosing a splice connection to an installed power cable comprising: a slit soft metal connector adapted for assembly astride an exposed length of an installed cable and the exposed end of a branchout cable and clenchable against each thereof to form a strong highcapacity power splice, a pair of resilient elastomeric grommets formed with passages therethrough each slit longitudinally of one side and which passages are sized to snugly embrace a respective one of said installed and branchout cables to either side of the splice connection, said slits in said grommets permitting the edges of the slits to be expanded to receive the cables laterally therethrough, a valve-equipped resilient plastic housing comprising a slit tubular main shell expandable sufficiently for the lateral insertion of an installed power cable spliced to a branchout cable past said slit, said main shell including means for locking the edges of said slit closed with the interior end portions of said main shell seated snugly against the periphery of a respective one of said grommets, said main shell having a charging opening for potting compound, a slit tubular valve sleeve having a snug fit about said main shell and rotatable to a position closing said charging opening, and a package of polymerizable potting compound ingredients held segregated prior to use and sufficient to charge the interior of said plastic housing and take a set to bond said components assembled about a cable splice junction.

9. A kit as defined in claim 8 characterized in that said grommets have annular resilient ribs projecting outwardly from the periphery thereof and inwardly from the sides of said cable seating passages.

10. A kit as defined in claim 8 characterized in that said grommets have a plurality of slit passages therethrough, and a separable slit grommet sleeve of resilient elastomeric material sized to have a sealing fit coaxially of one of said cable seating passages and a central opening to accommodate a smaller size cable than said cable seating passage.

11. A Kit as defined in claim 10 characterized in the provision of a plug having a snug fit within the central opening of said slit sleeve and usable along with said slit sleeve to plug any grommet cable seating passage not needed to seat a cable.

12. A kit as defined in claim 8 characterized in that said valve sleeve includes tangs projecting outwardly from either side of said slit and cooperable to guide flowable potting compound into said charging opening.

13. A kit as defined in claim 8 characterized in that one of said valve sleeves and said main shell have radial flange means cooperable with means on the other one thereof to hold these components assembled but permitting rotary movement of said valve sleeve between open and closed positions relative to said charging opening.

* * * * *